(12) United States Patent
Yamazaki et al.

(10) Patent No.: US 11,680,917 B2
(45) Date of Patent: Jun. 20, 2023

(54) CONTROLLER FOR THERMAL ANALYSIS APPARATUS, AND THERMAL ANALYSIS APPARATUS

(71) Applicant: HITACHI HIGH-TECH SCIENCE CORPORATION, Tokyo (JP)

(72) Inventors: Ryokuhei Yamazaki, Tokyo (JP); Susumu Ito, Tokyo (JP)

(73) Assignee: HITACHI HIGH-TECH SCIENCE CORPORATION, Tokyo (JP)

( * ) Notice: Subject to any disclaimer, the term of this patent is extended or adjusted under 35 U.S.C. 154(b) by 120 days.

(21) Appl. No.: 17/167,834

(22) Filed: Feb. 4, 2021

(65) Prior Publication Data

US 2021/0278353 A1 Sep. 9, 2021

(30) Foreign Application Priority Data

Mar. 4, 2020 (JP) .............................. JP2020-036513

(51) Int. Cl.
  *G01N 25/20* (2006.01)
  *G01K 17/00* (2006.01)
  *G01N 21/00* (2006.01)
  *G01J 5/00* (2022.01)

(52) U.S. Cl.
  CPC ............... *G01N 25/20* (2013.01); *G01J 5/00* (2013.01); *G01K 17/00* (2013.01); *G01N 21/00* (2013.01)

(58) Field of Classification Search
  CPC ........ G01N 25/20; G01N 21/00; G01K 17/00; G01J 5/00
  See application file for complete search history.

(56) References Cited

U.S. PATENT DOCUMENTS

| 2018/0080888 A1* | 3/2018 | Nazarian ................ G01N 25/22 |
| 2018/0356286 A1* | 12/2018 | Nagai ..................... G01J 3/502 |

FOREIGN PATENT DOCUMENTS

| JP | 1996-327573 A | 12/1996 | |
| JP | 2015-108540 A | 6/2015 | |
| WO | WO-2017080357 A1 * | 5/2017 | ............... C07F 5/02 |

OTHER PUBLICATIONS

Translation of JPH08327573A (Year: 1996).*
試料観察型 TG-DTA および DSC に最適化した 新ソフトウェアを提供開始, May 11, 2016 <https://www.rigaku.co.jp/rigaku.com/arrival/160 511.html> (3 pages).

* cited by examiner

*Primary Examiner* — Mirellys Jagan
(74) *Attorney, Agent, or Firm* — Holland & Hart LLP (57) ABSTRACT

Provided are a controller for a thermal analysis apparatus, with which thermal characteristics of a measurement target can be grasped, and a thermal analysis apparatus. A controller (51) for a thermal analysis apparatus, which is configured to measure thermal behavior accompanying a temperature change caused by one of heating and cooling of a measurement target (X, Y), is configured to: acquire an intensity of a response signal of the measurement target to an electromagnetic wave with which the measurement target is irradiated with respect to a variable of one of a time and a temperature; differentiate the intensity with respect to the variable; and output a derivative value obtained as a result of the differentiation with respect to one of the temperature and the time, or display the derivative value with respect to one of the temperature and the time on a predetermined display (53).

12 Claims, 8 Drawing Sheets

(1) $\int_0^t DSC\, dt = \Delta H$ (2) $DSC = \frac{d\,\Delta H}{dt}$ (3) $A \rightarrow B + H'$ (4) $\xi(t) = B(t) = -A(t)$ (5) $\Delta H = \xi(t) \cdot H'$ (6) $DSC = \frac{d(\xi(t) \cdot H')}{dt} = H' \cdot \frac{d\xi(t)}{dt}$ (7) $DSC = H' \cdot \frac{d\xi(t)}{dt} = H' \cdot v(t)$ (8) $\frac{dL(t)}{dt} = \alpha \cdot v(t)$

FROM (7) AND (8)

(9) $\frac{dL(t)}{dt} = \frac{\alpha}{H'} \cdot DSC$

| IRRADIATED ELECTROMAGNETIC WAVE | RESPONSE SIGNAL | INTENSITY OF RESPONSE SIGNAL | EXAMPLE OF MEASUREMENT TARGET | PHENOMENA THAT CAN BE MEASURED |
|---|---|---|---|---|
| VISIBLE LIGHT | REFLECTED LIGHT, SCATTERED LIGHT, TRANSMITTED LIGHT | COLOR, LUMINANCE | CHANGE IN COLOR OF SAMPLE | PHASE TRANSITION (MELTING, SOLIDIFICATION, GLASS TRANSITION, ETC.), REACTION (CRYSTALLIZATION, CURING REACTION, SOFTENING REACTION, THERMAL REACTION, PHOTOREACTION, ETC.) |
| ULTRAVIOLET RAY | FLUORESCENT LIGHT | FLUORESCENCE INTENSITY | CHANGE IN FLUORESCENCE | |
| INFRARED LIGHT | TRANSMITTED LIGHT, REFLECTED LIGHT | TRANSMITTANCE OF TRANSMITTED LIGHT, ABSORBANCE OF REFLECTED LIGHT | CHANGE IN MOLECULAR STRUCTURE | |
| RAMAN SPECTROSCOPY | RAMAN SCATTERING LIGHT | INTENSITY OF RAMAN SCATTERING LIGHT | CHANGE IN MOLECULAR STRUCTURE | |
| X RAY | DIFFRACTED X RAY | DIFFRACTED X-RAY INTENSITY | CHANGE IN CRYSTALLINE STATE | GLASS TRANSITION, CRYSTALLIZATION, OTHER REACTION IN WHICH CRYSTALLINITY IS CHANGED |

CONTROLLER FOR THERMAL ANALYSIS APPARATUS, AND THERMAL ANALYSIS APPARATUS

This application claims the benefit of Japanese Patent Application No. 2020-036513, filed Mar. 4, 2020, which is hereby incorporated by reference in its entirety into this application.

BACKGROUND OF THE INVENTION

1. Field of the Invention

The present invention relates to a controller for a thermal analysis apparatus configured to measure thermal behavior of a sample, and a thermal analysis apparatus including the controller.

2. Description of the Related Art

Hitherto, as a technique of evaluating temperature characteristics of a sample, there has been employed a technique called thermal analysis for measuring thermal behavior (physical change) accompanying a temperature change of a measurement sample caused by heating the sample. The thermal analysis includes all such techniques defined in JIS K 0129: 2005 "General rules for thermal analysis," and directed to measuring physical properties of a measurement target (measurement sample) obtained when the temperature of the measurement sample is controlled based on a program. As the thermal analysis, the following five methods are generally used: (1) differential thermal analysis (DTA) in which a temperature (temperature difference) is detected; (2) differential scanning calorimetry (DSC) in which a heat flux difference is detected; (3) thermogravimetry (TG) in which a mass (weight change) is detected; (4) thermomechanical analysis (TMA) in which mechanical characteristics are detected; and (5) dynamic viscoelasticity measurement (DMA).

In recent years, it is desired to observe a state of a sample during thermal analysis, and there is known a thermal analyzer in which a heating furnace configured to heat the sample has formed therein an opening, through which the sample is observable (see, for example, Japanese Patent Application Laid-open Nos. Hei 8-327573 and 2015-108540).

There is also reported a technology in which, when a temperature of an image of a sample that is being heated is specified in the DSC, color information of the image is displayed in RGB values along with the image (Rigaku homepage, "Press releases," "Rigaku launches new software optimized for measurement-sample-observing TG-DTA and DSC," [online], May 11, 2016, Internet, <URL: https://www.rigaku.co.jp/rigaku.com/arrival/160511.html>).

Figure 8:
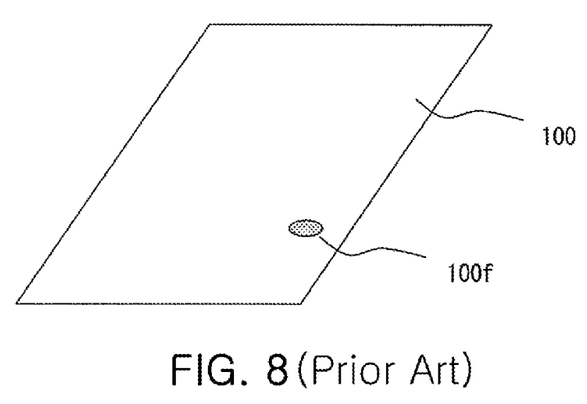
FIG. 8 is a diagram for illustrating a fisheye, which is a foreign matter in a screen protection film.

Meanwhile, as illustrated in FIG. 8, for example, as a product failure of a film 100, for example, a polymer film used as a screen protection film, a foreign matter called "fisheye" (fisheye-like spot) 100f may occur. The fisheye 100f is a fine foreign matter having a diameter of from about 10 μm to about 100 μm in the film 100 as a measurement sample. The fisheye 100f is generated because, although the fisheye 100f has the same composition as a matrix M (base material) of the film 100, a stretching degree or heat history at the time when the film is stretched is locally different from that of the matrix M, and the generated fisheye 100f has a physical property regarding thermal behavior that is different from that of the matrix M.

Through analysis of the thermal behavior (thermal characteristics) of the fisheye 100f, generation conditions of the fisheye 100f, for example, can be found, and effective measures can be taken.

However, because the fisheye 100f is mixed as a minute region in the matrix M of the film 100, its change in calorie is buried in a change of the matrix M that largely constitutes the film 100, and it is difficult in terms of sensitivity to detect the change in calorie of the fisheye 100f alone. Further, because the fisheye 100f has the same composition as the matrix M, infrared (IR) analysis and fluorescent X-ray analysis, for example, cannot be performed.

Meanwhile, because the fisheye 100f has characteristics (physical property) of changing in color at the time of melting, through observation of the change in color with respect to the temperature, the thermal characteristics may be acquired in some cases.

However, in the case of the technologies described in Japanese Patent Application Laid-open Nos. Hei 8-327573 and 2015-108540, a form of an image itself at a particular temperature is merely observed qualitatively in a pin-point manner, and the thermal characteristics cannot be measured quantitatively. Therefore, color information is merely observed qualitatively in a pin-point manner.

In other words, in both technologies, an image, for example, of the matrix M is merely observed, and the thermal characteristics of the foreign matter itself other than the matrix M are not measured quantitatively.

In view of the above-mentioned problem, the inventors of the present invention used a DSC apparatus similar to Japanese Patent Application Laid-open No. Hei 8-327573 to take an image of the film 100 in a heating furnace during DSC measurement and perform the DSC measurement of the film 100. Further, simultaneously with the DSC measurement, luminances of the fisheye 100f, which is a foreign matter in the image of the film 100, were acquired as a change in color, and its continuous change with the temperature was measured.

Figure 9:
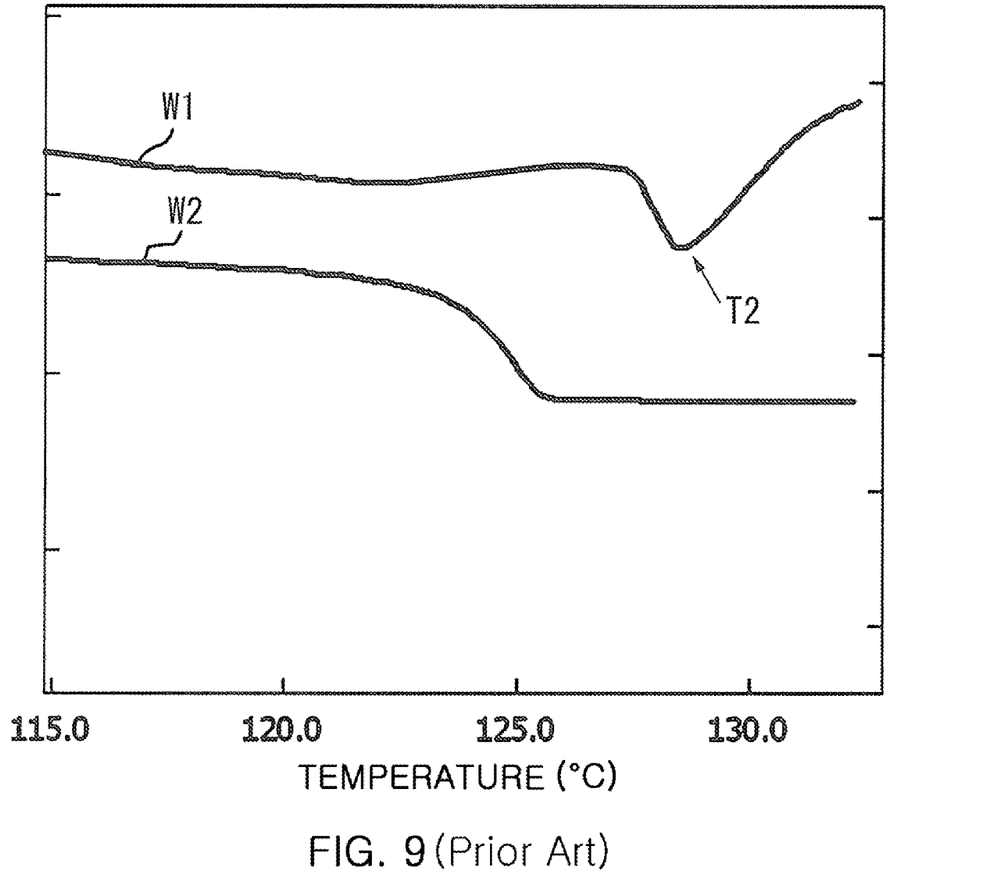
FIG. 9 is a graph for showing an example in which a change in color of the foreign matter with temperature is displayed to be superimposed on the DSC signal of the matrix.

As a result, as shown in FIG. 9, in addition to a DSC curve W1 of the film 100, a continuous curve W2 of the change in color (luminance) of the fisheye 100f with temperature was obtained.

However, although a melting point T2 of the film 100 itself could be determined based on the DSC curve W1 of FIG. 9, no clear inflection point was observed in the curve W2. Further, no thermal change indicating a melting point of the fisheye 100f, for example, could be observed from the DSC curve W1.

SUMMARY OF THE INVENTION

The present invention has been made to solve the above-mentioned problem, and therefore has an object to provide a controller for a thermal analysis apparatus, with which thermal characteristics of a measurement target that is difficult to perform thermal analysis, for example, a foreign matter in a measurement sample, can be grasped, and a thermal analysis apparatus.

In order to achieve the above-mentioned object, according to the present invention, there is provided a controller for a thermal analysis apparatus, which is configured to measure thermal behavior accompanying a temperature change caused by one of heating and cooling of a measurement target, the controller being configured to: acquire an intensity of a response signal of the measurement target to an electromagnetic wave with which the measurement target is irradiated with respect to a variable of one of a time and a temperature; differentiate the intensity with respect to the variable; and output a derivative value obtained as a result of the differentiation with respect to one of the temperature and the time, or display the derivative value with respect to one of the temperature and the time on a predetermined display.

According to the controller for a thermal analysis apparatus, a change in intensity of the response signal of the measurement target to the electromagnetic wave with which the measurement target is irradiated is differentiated with respect to the one of the time and the temperature, and the derivative value obtained as the result of the differentiation is output or displayed with respect to the one of the temperature and the time to analyze a curve of the derivative values. Therefore, the thermal characteristics of the measurement target that is difficult to perform the thermal analysis, for example, the foreign matter in the measurement sample, can be grasped.

In the controller for a thermal analysis apparatus of the present invention, the measurement target may be included in a matrix, have the same component as, or a different component from, the matrix, and have a different physical property from the matrix, and the matrix and the measurement target may integrally form a measurement sample.

According to the controller for a thermal analysis apparatus, thermal characteristics of the foreign matter, which is a minute measurement target, is not buried in the change of the matrix to make the analysis difficult as opposed to the differential thermal analysis or the differential scanning calorimetry, and the thermal characteristics of the measurement target that is difficult to perform the thermal analysis, for example, the foreign matter, can be grasped reliably.

In the controller for a thermal analysis apparatus of the present invention, the thermal analysis apparatus may be configured to perform one of differential thermal analysis and differential scanning calorimetry of the measurement sample, and the controller may be configured to display, on the predetermined display, the derivative value and one of differential heat and differential scanning calorie of the measurement sample to be superimposed on each other on one of the same temperature axis and the same time axis.

According to the controller for a thermal analysis apparatus, the differential thermal analysis or the differential scanning calorimetry and the derivative value of the measurement sample can be compared with each other, and the thermal characteristics of the measurement target that is difficult to perform the thermal analysis can be grasped quantitatively.

In the controller for a thermal analysis apparatus of the present invention, the matrix around the measurement target may be also irradiated with the electromagnetic wave, and, when a user specifies a position of the measurement target based on an image obtained by the irradiation with the electromagnetic wave, the controller may acquire the intensity at the position.

According to the controller for a thermal analysis apparatus, the matrix and the measurement target are different in position at which the response signal is generated, and hence the response signal of only the measurement target can be separated for analysis. Thus, thermal characteristics of the foreign matter, which is a minute measurement target, is not buried in the change of the matrix to make the analysis difficult as opposed to the differential thermal analysis or the differential scanning calorimetry, and the thermal characteristics of the measurement target that is difficult to perform the thermal analysis, for example, the foreign matter, can be grasped reliably.

In the controller for a thermal analysis apparatus of the present invention, the matrix may include a plurality of types of the measurement targets, and the controller may be configured to differentiate, for each of the plurality of types of measurement targets, corresponding one of the intensities with respect to the variable, and display a derivative value obtained as a result of the differentiation with respect to the one of the temperature and the time on the predetermined display.

According to the controller for a thermal analysis apparatus, for example, a plurality of minute amounts of measurement targets (for example, additives) in a composite, which is the measurement sample, can be analyzed, for example.

In the controller for a thermal analysis apparatus of the present invention, the controller may be configured to acquire one of a temperature and a time at one of an extrapolated point and an extreme of the derivative value.

According to the controller for a thermal analysis apparatus, a point of change in physical property, for example, a phase transition or a melting point of the measurement target can be acquired automatically based on an inflection point and the extrapolated point.

According to the present invention, there is provided a thermal analysis apparatus including the above-mentioned controller for a thermal analysis apparatus, the thermal analysis apparatus being configured to measure thermal behavior accompanying a temperature change caused by one of cooling and heating of the measurement sample.

The thermal analysis apparatus may be one of a differential thermal analysis apparatus and a differential scanning calorimetry apparatus.

According to the present invention, it is possible to grasp the thermal characteristics of the measurement target that is difficult to perform the thermal analysis, for example, the foreign matter in the measurement sample.

DESCRIPTION OF THE EMBODIMENTS

Figure 1:
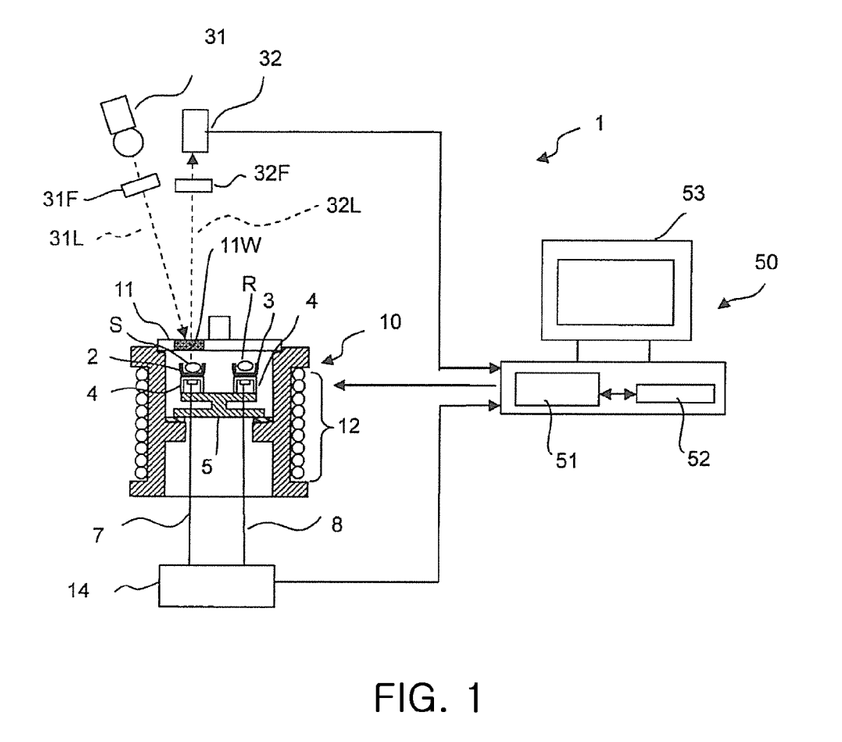
FIG. 1 is a cross-sectional view for illustrating a configuration of a thermal analysis apparatus according to an embodiment of the present invention.

In the following, an embodiment of the present invention is described with reference to the drawings. FIG. 1 is a cross-sectional view for illustrating a configuration of a thermal analysis apparatus according to the embodiment of the present invention.

A thermal analysis apparatus 1 is a differential scanning calorimeter (DSC), and has a configuration similar to that of a related-art differential scanning calorimeter except that a window 11W, with which the inside of the differential scanning calorimeter 1 can be observed, is provided in a lid 11 of a heating furnace 10, and hence an outline of the differential scanning calorimeter 1 is described.

The differential scanning calorimeter 1 includes a measurement sample container 2 configured to house a measurement sample S, a reference substance container 3 configured to house a reference substance R, the heating furnace 10, a thermal resistor 4 connected between each of the measurement sample container 2 and the reference substance container 3, and the heating furnace 10 to form a heat flow path therebetween, a measurement-sample-side thermocouple 7, a reference-substance-side thermocouple 8, a light source 31, for example, an LED, a CCD camera 32, and a personal computer 50.

A wire-wound heater 12 is wound around the circumference of the heating furnace 10 to heat the heating furnace 10. The outside of the heater 12 is covered by a cover (not shown).

The CCD camera 32 is of an area scan type, for example, but may be of a line scan type, or another solid-state imaging element, for example, a CMOS camera, may be used therefor.

The personal computer 50 includes a central processing unit (CPU) 51, a storage 52, for example, a hard disk, a display 53, for example, a liquid crystal monitor, and a keyboard (not shown), for example.

The CPU 51 corresponds to the "controller" in the claims.

The heating furnace 10 is formed into a cylindrical shape, and has an H-shaped cross section along an axial direction. Further, a heat plate 5 having a substantially double disc shape is placed above a ring-shaped projection protruding radially inward from the center in the axial direction.

Further, on an upper surface of the heat plate 5, the measurement sample container 2 and the reference substance container 3 are placed via two thermal resistors 4, respectively, and the measurement sample container 2 and the reference substance container 3 are housed in an inner space enclosed with the heating furnace 10.

The measurement-sample-side thermocouple 7 and the reference-substance-side thermocouple 8 penetrate through the thermal resistors 4 and the heat plate 5, and have tip ends thereof connected to lower surfaces of the measurement sample container and the reference substance container 3, respectively, by soldering, for example. Meanwhile, the measurement-sample-side thermocouple 7 and the reference-substance-side thermocouple 8 have the other ends thereof extracted to the lower side of the heating furnace 10 and connected to an amplifier 14, which serves as a signal processing circuit.

In this manner, the measurement-sample-side thermocouple 7 and the reference-substance-side thermocouple 8 form what is called a differential thermocouple, and are configured to sense a temperature difference between the measurement sample S and the reference substance R. This temperature difference is recorded as a heat flux difference signal. Meanwhile, a temperature of the measurement sample is recorded from the measurement-sample-side thermocouple 7.

Further, a temperature of the heating furnace 10 is input to the CPU 51 via various control circuits, and the CPU 51 is configured to perform energization control on the heater 12 to heat or cool the heating furnace 10 at a constant speed.

Further, the lid 11 is removably placed on an upper end opening of the heating furnace 10 to shield the inside of the heating furnace 10 from the outside air.

Still further, in a part of the lid 11 that overlaps the measurement sample container 2 in the axial direction of the heating furnace 10, the window 11W made of quartz glass is provided, and the CCD camera 32 is arranged above the window 11W.

Further, above the window 11W, and on a line different from an axial line of the CCD camera 32, the light source 31 configured to illuminate the measurement sample S in the heating furnace 10 through the window 11W is arranged.

The measurement sample S (foreign matter therein) is irradiated with visible light ("electromagnetic wave" in the claims 31L from the light source 31, and the CCD camera 32 acquires a luminance ("intensity" in the claims) of reflected light ("response signal" in the claims 32L from the foreign matter.

Between the window 11W and the light source 31, and between the window 11W and the CCD camera 32, filters 31F and 32F are arranged, respectively, to irradiate the window 11W with only light having a predetermined component, and to cause only reflected light having a predetermined component to be received by the CCD camera 32. It should be noted, however, that the filters 31F and 32F are not essential. Further, in the case of a coaxial vertical illumination (of a half mirror type), the light source 31 of the irradiation light and an optical axis of the camera 32 match each other.

Figure 2:
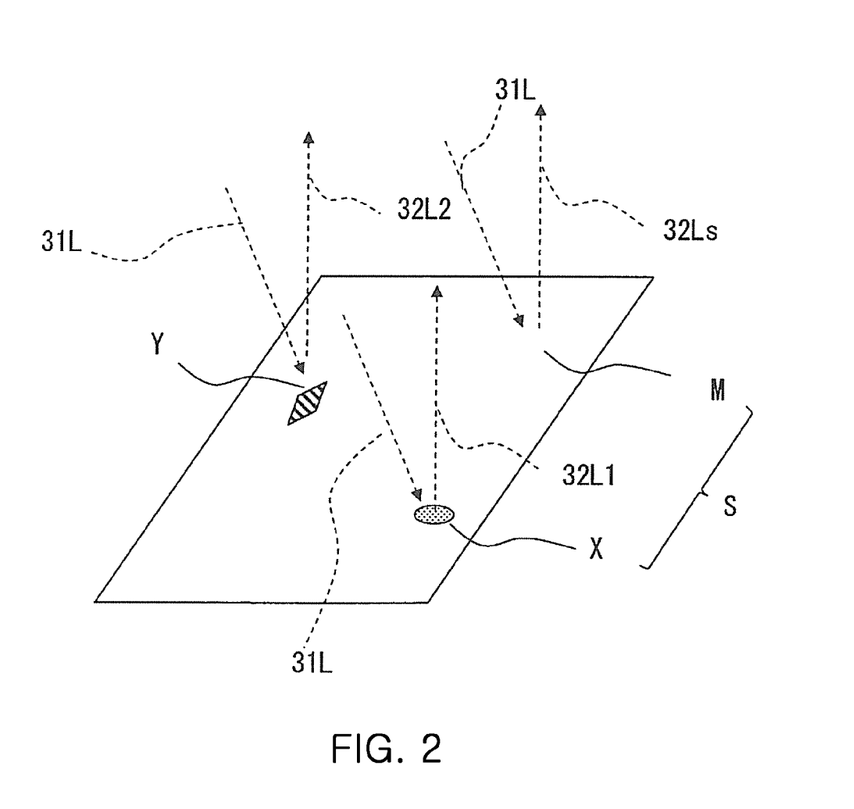
FIG. 2 is a diagram for illustrating foreign matters in a matrix.

FIG. 2 shows foreign matters X and Y in a matrix M in the measurement sample S. In this example, the foreign matters X and Y refer to those that exist in amounts smaller than that of the matrix M in the matrix M (including the surface). Further, the foreign matters X and Y are normally in such minute amounts that peaks of differential heat (DTA) or differential scanning calorie (DSC), for example, do not appear. In the following description, a part that is the same as a resin film as the measurement sample S is the matrix M, and the foreign matter is one type of foreign matter X (above-mentioned fisheye).

The foreign matters X and Y correspond to "measurement targets" in the claims.

The CPU 51 is configured to take in a DSC signal from the amplifier 14 and an image signal from the CCD camera 32, perform various kinds of processing to be described below, and store a result of the processing in the storage 52, output the result as data, or display the result on a screen of the display 53.

Figure 3:
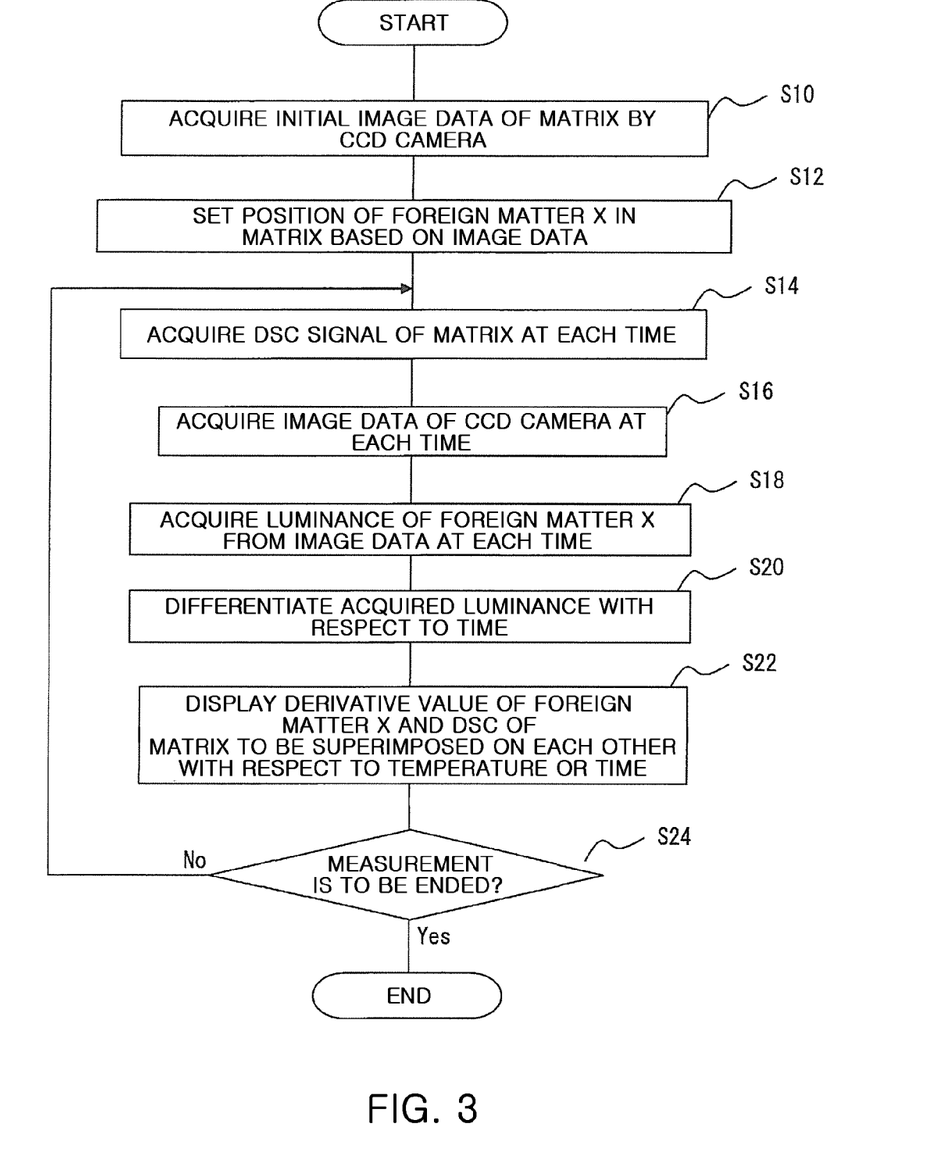
FIG. 3 is a diagram for illustrating a flow of processing performed by a CPU (controller).

Next, referring to FIG. 3, the processing performed by the CPU 51 is described.

The CPU 51 first acquires data of an initial image (see FIG. 2) of the measurement sample S taken by the CCD camera 32 (Step S10).

Next, the CPU 51 sets a position of the foreign matter X in the matrix M based on the image data of Step S10 (Step S12). Specifically, when a user clicks on the position of the foreign matter X as illustrated in FIG. 2 on the screen of the display 53, for example, positional information of the foreign matter X is acquired by the CPU 51.

This positional information may be one point (for example, the center) for each of the foreign matters, or may be a predetermined region tracing an outer edge of the foreign matter. Further, when one point (for example, the center) of the foreign matter is specified, a circle having a predetermined radius or a predetermined area with the point being the center may be regarded as a virtual area.

Next, the CPU 51 acquires a DSC signal of the measurement sample S (the whole bulk including the matrix M and the foreign matter X) at each time (Step S14). The processing of Step S14 is similar to processing performed by the related-art differential scanning calorimeter (DSC). In the processing, the matrix M and the foreign matter X included in the measurement sample S are heated or cooled, and differential scanning calories (DSC) thereof are measured.

In the present invention, the DSC signal is acquired with respect to one variable of a time or a temperature. Generally in the differential scanning calorimeter, the heating or cooling speed is constant, and the time and the temperature correlate with each other.

Next, the CPU 51 acquires image data acquired by the CCD camera 32 at each time in parallel to Step S14 (Step S16). When the image data is acquired in Step S16, it is preferred that the same variable as the variable (in this example, time) with reference to which the DSC signal is acquired in Step S14 be used, but a different variable may be used.

Next, the CPU 51 acquires a luminance of the foreign matter X from the image data acquired in Step S16 at each time (Step S18). The luminance is acquired based on the positional information of the foreign matter X acquired in Step S12. When the position of the foreign matter X is a predetermined region, a value obtained by averaging or adding up luminances of pixels of image data in the region is adopted.

Next, the CPU 51 differentiates the acquired luminance with respect to time (Step S20). This differentiation is performed with respect to the same variable as that of Step S16.

Next, the CPU 51 displays a derivative value of the foreign matter X acquired in Step S20 and the DSC of the measurement sample S to be superimposed on each other with respect to the temperature or time (Step S22). It is only required that the display in Step S22 be performed with respect to one of the temperature or time.

Next, the CPU 51 determines whether to end the measurement in Step S24, ends the processing when the answer is Yes, and returns to Step S14 when the answer is No. Whether to end the measurement in Step S24 may be specified by the user, for example, or a time when a maximum temperature (end temperature) of DSC measurement is reached may be regarded in advance as the end of the measurement, and the present invention is not particularly limited thereto.

Figure 4:
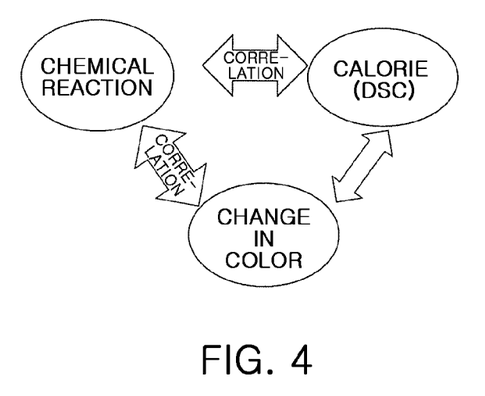
FIG. 4 is a diagram for illustrating a technical meaning of a derivative of an intensity of a response signal of a foreign matter.
Figure 5:
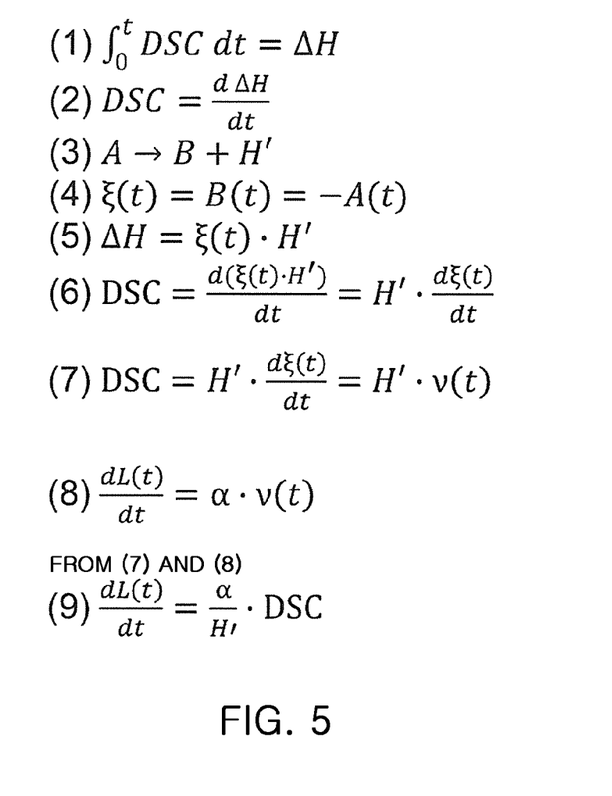
FIG. 5 is a diagram for illustrating relational expressions of the derivative of the intensity of the response signal of the foreign matter and a DSC signal.

Now, referring to FIG. 4 and FIG. 5, a technical meaning of the differentiation of Step S20 is described.

As illustrated in FIG. 4, a calorie (DSC) is thermal behavior accompanying a temperature change caused by heating or cooling of the measurement sample, and is correlated with a chemical reaction of a sample.

Meanwhile, the chemical reaction may be correlated with a change in color of the sample in some cases, and based on the above-mentioned facts, it is expected that the DSC and the change in color are correlated with each other.

This can be expressed by the expressions illustrated in FIG. 5.

Here, from the expression (1) of FIG. 5, an integral of the DSC signal at a time "t" is a calorie $\Delta H$. The expression (2) indicates that, from the expression (1), the DSC signal is a time derivative (calorie generated at the moment) of the calorie $\Delta H$. In the expression (3), it is assumed that, as the calorie $\Delta H$ of the expression (1), when a substance B is generated from a substance A, a calorie H' is generated per molecule.

The expression (4) indicates that a reaction progress degree "$\xi$" corresponds to the number of reacted molecules. The expression (5) indicates that, from the expressions (3) and (4), the calorie $\Delta H$ is obtained by multiplying the number of reacted molecules $\xi(t)$ by the calorie H'. The expression (6) is obtained by substituting the expression (5) into the expression (2), and indicates that the DSC signal is correlated with a time derivative of the reaction progress degree "$\xi$".

Here, based on the original definition of "$\xi$", the time derivative of "$\xi$" is a reaction speed "v", and hence the expression (6) can be expressed by the expression (7) with the use of the reaction speed "v".

Further, as described above with reference to FIG. 4, when it is assumed that the reaction speed "v" is correlated with the change in color of the substance (when the reaction progresses, the color changes), a time derivative (ratio of change with time) of a brightness L is proportional to the reaction speed "v" in the expression (8) ($\alpha$: proportionality factor).

Then, the expression (7) is substituted into the expression (8), and as indicated by the expression (9), the time derivative (ratio of change in color) of the brightness L is correlated with the DSC signal.

In other words, the derivative of the luminance obtained in Step S20 can be regarded as a function expressing thermal behavior corresponding to the DSC signal, and thermal characteristics (temperature, for example, melting point) of the foreign matter can be grasped quantitatively. It should be noted, however, that quantification as a calorie value cannot be performed based on the change as opposed to DSC.

Figure 6:
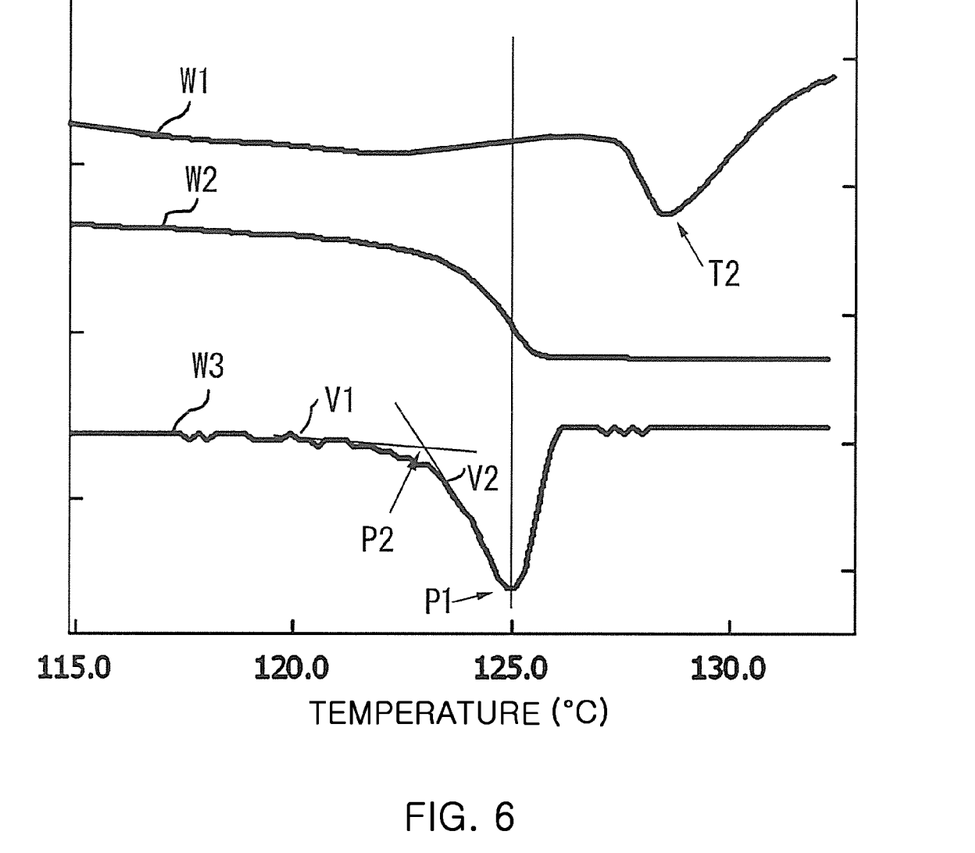
FIG. 6 is a graph for showing an example in which a derivative value of a change in color of the foreign matter is displayed to be superimposed on the DSC signal of the matrix.

FIG. 6 shows an example of a display mode of Step S22. In FIG. 6, in addition to the DSC curve W1 and the continuous curve W2 of the change in color of the foreign matter X of FIG. 9, a derivative curve W3 of the change in color of the foreign matter X was obtained.

Then, the melting point T2 of the film 100 itself could be determined from the DSC curve W1. Further, although it was unclear from the continuous curve W2 of the change in color of the foreign matter X where a melting point of the foreign matter X is, it was found from the derivative curve W3 of the change in color of the foreign matter X that the melting point of the foreign matter X was a temperature (about 125° C.) of a variance point P.

As described above, through the differentiation of the change in color of the foreign matter in response to the visible light with which the foreign matter is irradiated with respect to the time or the temperature, and the display of the derivative value with respect to the time or the temperature, DSC measurement of the measurement sample and the derivative value can be compared with each other, and the thermal characteristics of the foreign matter that is included in a minute amount in the measurement sample and is difficult to perform thermal analysis can be grasped quantitatively.

Further, instead of directly performing differential thermal analysis or differential scanning calorimetry of the foreign matter X mixed in the measurement sample, the change in color (luminance), for example, of the foreign matter X is measured. Therefore, as illustrated in FIG. 2, the matrix M and the foreign matter X are different in positions on the image at which luminance signals 32Ls and 32L1 are generated, respectively, and hence only the luminance signal 32L1 of the foreign matter X can be separated for analysis. As a result, thermal characteristics of the minute foreign matter X can be prevented from being buried in the change of the matrix M to make the analysis difficult as opposed to the differential thermal analysis or the differential scanning calorimetry, and the thermal characteristics of the foreign matter X can be grasped reliably.

As a result, for example, a minute amount of foreign matter (for example, additive) in a composite as the measurement sample can be analyzed, for example.

In particular, when the DSC and the derivative value of the measurement sample are displayed to be superimposed on each other on the same temperature axis or time axis, the both can be compared easily and accurately, which is preferred.

When a plurality of types of foreign matters are mixed in the matrix M, the corresponding intensity, for example, the luminance may be differentiated for each of the plurality of types of foreign matters, and displayed with respect to the temperature or the time.

For example, in FIG. 2, luminances 32L1 and 32L2 may be acquired at different positions on the image, which correspond to the plurality of types of foreign matters X and Y.

Further, the derivative value may be output instead of being displayed with respect to the temperature or the time. This output includes storing the derivative value in a predetermined storage, and printing the derivative value by a printer, for example.

In the present invention, the temperature or the time at an inflection point (extreme) P1 or an extrapolated point P2 of the derivative curve W3 as shown in FIG. 6 may be automatically acquired by the CPU 51. An inflection point or an extrapolated point is widely known in thermal analysis, as a method of determining a point of change of a physical property, for example, a phase transition or a melting point of the sample.

For example, when the temperature acquired as described above matches a temperature registered in advance for each type of the foreign matters, the type of the foreign matter may be determined automatically.

The inflection point P1 can be acquired from a point at a slope=0 of the derivative curve W3. The extrapolated point P2 can be determined as follows: a baseline V1 of the derivative curve W3 is determined by a predetermined method in a region in which the temperature or the time is smaller than the inflection point P1, a tangent line at a point with the maximum slope from the baseline V1 to the inflection point P1 is determined as a rising line V2, and an intersection of the baseline V1 and the rising line V2 is the extrapolated point.

It is apparent that the acquisition of the temperature or the time at the inflection point P1 or the extrapolated point P2 may be performed not by the CPU 51, but manually from a print or the displayed derivative curve W3.

The present invention is not limited to the embodiment described above, and encompasses various modifications and equivalents within the spirit and scope of the present invention.

A measurement target may be a component (additive or impurity, for example) that is different from the matrix, in addition to the measurement target (foreign matter, for example, fisheye) that is included in the matrix, has the same component as that of the matrix, has a different physical property from the matrix, and forms the measurement sample integrally with the matrix as described above.

Further, the measurement target itself may be the measurement sample per se, but may be in a minute amount so that the differential thermal analysis or the differential scanning calorimetry cannot be performed.

When the measurement target itself is the measurement sample and is in a minute amount, only the derivative value of the intensity of the response signal, for example, the luminance described above, can be obtained. However, when the derivative value is separately compared with data of differential heat or differential scanning calorie of the known sample on the same temperature axis or time axis, the thermal characteristics of the measurement target can be grasped quantitatively.

The electromagnetic wave with which the foreign matter in the measurement sample is irradiated is not limited to the visible light radiated from the above-mentioned light source 31. Further, without limiting to the electromagnetic wave using some kind of light source or irradiation source, the electromagnetic wave may be in a form in which the measurement sample (the matrix or the foreign matter) is irradiated directly with natural light through a transparent window. Further, the intensity of the response signal of the foreign matter to the electromagnetic wave with which the foreign matter is irradiated is not limited to the above-mentioned luminance.

Figure 7:
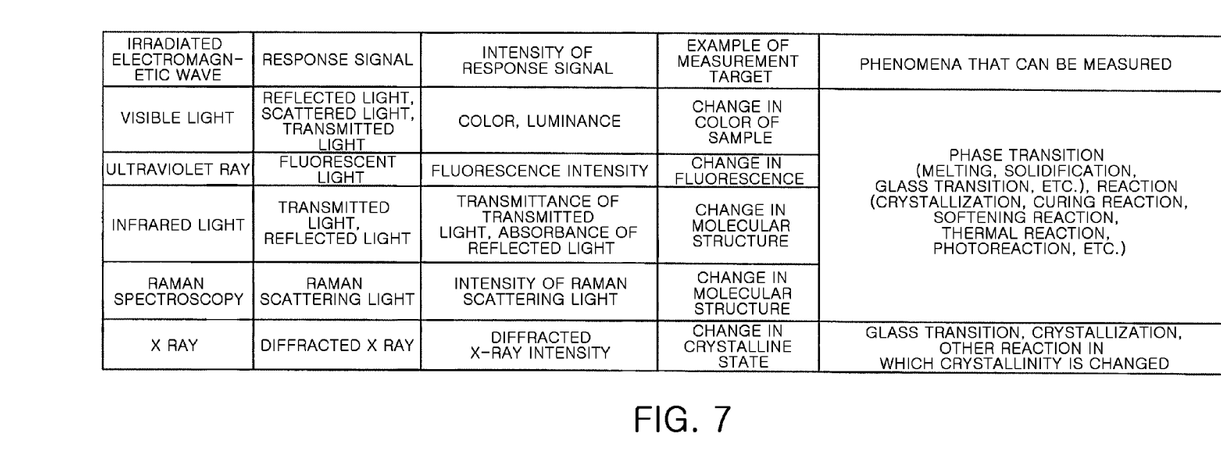
FIG. 7 is a diagram for illustrating examples of a measurement target and phenomena that can be measured for a combination of an electromagnetic wave with which a foreign matter is irradiated and an intensity of a response signal to the electromagnetic wave.

FIG. 7 shows examples of a combination of the electromagnetic wave with which the foreign matter is irradiated, and the intensity of a response signal to the electromagnetic wave. Without limiting to the combination of the visible light and the luminance described above, for example, the sample (foreign matter) may be irradiated with an X ray to obtain a diffracted X-ray intensity for the X ray. When the foreign matter is irradiated with the X ray, as opposed to the case in which the foreign matter is irradiated with the visible light, a window configured to transmit light is not required in the measurement apparatus (differential scanning calorimeter), and the foreign matter can be irradiated with the X ray penetrating through a wall of the apparatus.

Further, FIG. 7 shows examples of a measurement target and phenomena that can be measured in each combination of the electromagnetic wave and the intensity of the response signal. For example, when the foreign matter is irradiated with the X ray, a change in crystal state of the foreign matter can be measured based on the diffracted X-ray intensity, and the phenomena include a reaction in which crystallinity is changed, for example, glass transition.

Further, as in the example described above, the entire measurement sample including the matrix and the foreign matter may be irradiated with the electromagnetic wave, and of the response signals to the electromagnetic wave, only a signal (for example, luminance) at the position corresponding to the foreign matter may be acquired. Still further, only the position corresponding to the foreign matter may be irradiated with the electromagnetic wave to obtain a response signal to the electromagnetic wave.

Further, when the change in color is acquired, the color may be, in addition to a luminance having a particular wavelength, information obtained by converting the color into numbers. Examples of the information obtained by the numerical conversion include: Lab (L*a*b*) values in the CIE (International Commission on Illumination) 1976 color space; RGB values expressing a color in a combination of red, green, and blue, which are called "primary colors of light"; and CMYK values expressing a color in a combination of three colors of cyan, magenta, and yellow, which are called "primary colors of pigment," and black, but the present invention is not limited thereto. Examples of the information obtained by the numerical conversion also include XYZ values in the CIE 1931 color space, L*u*v* values in the CIE 1976 color space, and CIECAM02.

The present invention is applicable not only to the differential scanning calorimeter but also to a differential thermal analyzer (DTA). Further, the present invention is applicable not only to the differential scanning calorimeter (DSC) in which the speed of heating or cooling is constant, but also to a temperature modulated differential scanning calorimeter (DSC), in which heating and cooling are repeated periodically.

Further, the controller for a thermal analysis apparatus according to the present invention can be mounted in an existing thermal analysis apparatus.

What is claimed is:

1. A controller for a thermal analysis apparatus, the thermal analysis apparatus being configured to measure a thermal behavior accompanying a temperature change caused by one of heating and cooling of a measurement target, the controller being configured to:
   acquire an intensity of a response signal of the measurement target, which is being heated or cooled, to an electromagnetic wave with which the measurement target is irradiated with respect to a variable of one of a time and a temperature;
   differentiate the intensity with respect to the variable; and
   output a derivative value obtained as a result of the differentiation with respect to one of the temperature and the time, or display the derivative value with respect to one of the temperature and the time on a predetermined display as a function expressing the thermal behavior of the measurement target.

2. The controller for a thermal analysis apparatus according to claim 1, wherein the controller is configured to acquire one of a temperature and a time at one of an extrapolated point and an extreme of the derivative value.

3. The controller for a thermal analysis apparatus according to claim 1, wherein the measurement target is included in a matrix, has a same component as, or a different component from, the matrix, and has a different physical property from the matrix, and the matrix and the measurement target integrally form a measurement sample.

4. The controller for a thermal analysis apparatus according to claim 3,
   wherein the matrix includes a plurality of types of measurement targets, and
   wherein the controller is configured to differentiate, for each of the plurality of types of measurement targets, a corresponding one of the intensities with respect to the variable, and display a derivative value obtained as a result of the differentiation with respect to the one of the temperature and the time on the predetermined display.

5. A thermal analysis apparatus comprising the controller for a thermal analysis apparatus of claim 4, the thermal analysis apparatus being configured to measure the thermal behavior accompanying a temperature change caused by one of cooling and heating of the measurement target.

6. The thermal analysis apparatus according to claim 5, wherein the thermal analysis apparatus is one of a differential thermal analysis apparatus and a differential scanning calorimetry apparatus.

7. The controller for a thermal analysis apparatus according to claim 3,
   wherein the thermal analysis apparatus is configured to perform one of differential thermal analysis and differential scanning calorimetry of the measurement sample while acquiring the intensity of the response signal of the measurement target that is being heated or cooled, and
   wherein the controller is configured to display, on the predetermined display, the derivative value and one of differential heat and differential scanning calorie of the measurement sample to be superimposed on each other on one of a same temperature axis and a same time axis.

8. The controller for a thermal analysis apparatus according to any of claim 3 or 7,
   wherein the matrix around the measurement target is also irradiated with the electromagnetic wave, and
   wherein, when a user specifies a position of the measurement target based on an image obtained by irradiating the measurement target with the electromagnetic wave, the controller acquires the intensity at the position.

9. A thermal analysis apparatus comprising the controller for a thermal analysis apparatus of claim 8, the thermal analysis apparatus being configured to measure the thermal behavior accompanying a temperature change caused by one of cooling and heating of the measurement target.

10. The thermal analysis apparatus according to claim 9, wherein the thermal analysis apparatus is one of a differential thermal analysis apparatus and a differential scanning calorimetry apparatus.

11. A thermal analysis apparatus comprising the controller for a thermal analysis apparatus of any one of claims 1 to 7, the thermal analysis apparatus being configured to measure the thermal behavior accompanying the temperature change caused by one of cooling and heating of the measurement target.

12. The thermal analysis apparatus according to claim 11, wherein the thermal analysis apparatus is one of a differential thermal analysis apparatus and a differential scanning calorimetry apparatus.

* * * * *